(12) United States Patent
Tolbert et al.

(10) Patent No.: US 8,480,368 B2
(45) Date of Patent: Jul. 9, 2013

(54) WELDING PROCESS AND COMPONENT PRODUCED THEREFROM

(75) Inventors: Ronald Gene Tolbert, Cincinnati, OH (US); Eric Scott Huron, West Chester, OH (US); David Paul Mourer, Beverly, MA (US); Douglas Gerard Konitzer, West Chester, OH (US)

(73) Assignee: General Electric Company, Schenectady, NY (US)

( * ) Notice: Subject to any disclaimer, the term of this patent is extended or adjusted under 35 U.S.C. 154(b) by 816 days.

(21) Appl. No.: 12/701,050

(22) Filed: Feb. 5, 2010

(65) Prior Publication Data
US 2011/0194940 A1    Aug. 11, 2011

(51) Int. Cl.
*F01D 5/02*    (2006.01)
(52) U.S. Cl.
USPC ............ 416/213 R; 416/234; 416/241 R; 29/889.23; 148/649
(58) Field of Classification Search
USPC   416/213 R, 234, 241 R; 29/889.23; 148/649; 228/113
See application file for complete search history.

(56) References Cited

U.S. PATENT DOCUMENTS

| | | | | |
|---|---|---|---|---|
| 4,479,293 A | * | 10/1984 | Miller et al. | 29/889.23 |
| 4,529,452 A | * | 7/1985 | Walker | 148/527 |
| 4,750,946 A | * | 6/1988 | Jahnke et al. | 228/265 |
| 4,825,522 A | * | 5/1989 | Iwai et al. | 29/889.2 |
| 5,106,012 A | | 4/1992 | Hyzak et al. | |
| 5,161,950 A | | 11/1992 | Krueger et al. | |
| 2008/0016688 A1 | | 1/2008 | Fabre et al. | |
| 2008/0120842 A1 | | 5/2008 | Wines et al. | |
| 2008/0124210 A1 | | 5/2008 | Wayte et al. | |

FOREIGN PATENT DOCUMENTS

| | | |
|---|---|---|
| EP | 1920870 A1 | 5/2008 |
| EP | 2047945 A1 | 4/2009 |
| GB | 535229 | 4/1941 |

OTHER PUBLICATIONS

EP Search Report and Opinion issued Jul. 8, 2011 in connection with corresponding EP Application No. 11155086.9.

* cited by examiner

*Primary Examiner* — Ninh H Nguyen
(74) *Attorney, Agent, or Firm* — General Electric Company; David J. Clement; Sushupta T. Sudarshan

(57) ABSTRACT

A process of fabricating a rotating component and components formed thereby. The process includes fabricating preforms corresponding to portions of the component. Each preform has an interface surface at which the preforms can be joined to locate a first of the portions in a radially outward direction from a second of the portions. The preforms are then inertia welded together to form a profile having a solid-state weld joint containing a finer-grained material than other portions of the profile. The profile is then forged with dies to produce a forging. At least one of the dies has a recess into which the finer-grained material from the weld joint is expelled during forging to purge a joint region of the forging between the forging portions of the finer-grained material. The joint region contains grains distorted in an axial direction of the forging.

20 Claims, 4 Drawing Sheets

WELDING PROCESS AND COMPONENT PRODUCED THEREFROM

BACKGROUND OF THE INVENTION

The present invention generally relates to fabrication processes that include a joining operation. More particularly, this invention is directed to a technique for fabricating rotating hardware, as an example, rotating components of a turbomachine, joining techniques used in their fabrication, and the hardware formed thereby.

Components within the combustor and turbine sections of a gas turbine engine are often formed of superalloy materials in order to achieve acceptable mechanical properties while at elevated temperatures resulting from the hot combustion gases produced in the combustor. Higher compressor exit temperatures in modern high pressure ratio gas turbine engines can also necessitate the use of high performance superalloys for compressor components, including blades, spools, disks (wheels) and other components. Suitable alloy compositions and microstructures for a given component are dependent on the particular temperatures, stresses, and other conditions to which the component is subjected. For example, the rotating hardware such as compressor spools, compressor disks, and turbine disks are typically formed of superalloys that must undergo carefully controlled forging, heat treatments, and surface treatments to produce a controlled grain structure and desirable mechanical properties. Notable superalloys for these applications include gamma prime ($\gamma'$) precipitation-strengthened nickel-base superalloys containing chromium, tungsten, molybdenum, rhenium and/or cobalt as principal elements that combine with nickel to form the gamma ($\gamma$) matrix, and contain aluminum, titanium, tantalum, niobium, and/or vanadium as principal elements that combine with nickel to form the desirable gamma prime precipitate strengthening phase, principally $Ni_3(Al,Ti)$. Examples of gamma prime nickel-base superalloys include René 88DT (R88DT; U.S. Pat. No. 4,957,567) and René 104 (R104; U.S. Pat. No. 6,521,175), as well as certain nickel-base superalloys commercially available under the trademarks Inconel®, Nimonic®, and Udimet®. Disks and other critical gas turbine engine components are often forged from billets produced by powder metallurgy (P/M), conventional cast and wrought processing, and spraycast or nucleated casting forming techniques. Forging is typically performed on fine-grained billets to promote formability, after which a supersolvus heat treatment is often performed to cause uniform grain growth (coarsening) to optimize properties.

A turbine disk 10 of a type known in the art is represented in FIG. 1. The disk 10 generally includes an outer rim 12, a central hub 14, and a web 16 between the rim and hub 12 and 14. The rim 12 is configured for the attachment of turbine blades (not shown) in accordance with known practice. A hub bore 18 in the form of a through-hole is centrally located in the hub 14 for mounting the disk 10 on a shaft, and therefore the axis of the hub bore 18 coincides with the axis of rotation of the disk 10. The disk 10 is presented as a unitary forging of a single alloy, and is representative of turbine disks used in aircraft engines, including but not limited to high-bypass gas turbine engines such as the GE90® and GEnx® commercial engines manufactured by the General Electric Company. The weight and cost of single-alloy forgings have driven the desire to develop materials, fabrication processes, and hardware designs capable of reducing forging weight and costs for rotating hardware of gas turbines. One approach is prompted by the fact that the hubs and webs of compressor spools and disks and turbine disks have lower operating temperatures than their rims, and therefore can be formed of alloys with properties different from those required at the rims. Depending on the particular alloy or alloys used, optimal microstructures for the hub, web and rim can also differ. For example, a relatively fine grain size may be optimal for the hub and web to improve tensile strength and resistance to low cycle fatigue, while a coarser grain size may be optimal in the rim for improving creep, stress-rupture, and crack growth resistance.

Implementing a multi-alloy design generally entails separately fabricating the hub and rim of a disk from different materials and then joining the hub and rim by welding or another metallurgical joining process, as disclosed in U.S. Published Patent Application Nos. 2008/0120842 and 2008/0124210. Though a variety of joining techniques are available for producing multi-alloy disks, each has certain shortcomings. For example, electron beam (EB) welding creates a resolidified weld zone that is always weaker than the materials welded together, and joints formed by diffusion bonding (DB) and brazing are also weaker than the materials they join as a result of providing no mechanical work to the joint region. Solid-state welding processes such as inertia welding are disclosed in U.S. Pat. No. 6,969,238. While well suited for certain applications, weld joints formed by inertia welding are fine grained and therefore limit the high temperature operation of a disk. Furthermore, if the disk is heat treated to produce coarser grain size, the inertia weld joint is prone to cracking and critical grain growth during supersolvus heat treatment.

Further examples of metallurgical joining techniques for fabricating multi-alloy disks and spools are disclosed in U.S. Pat. Nos. 5,106,012 and 5,161,950. These patents describe a technique termed forge enhanced bonding, by which separately formed regions of a disk can be bonded together during a forging operation. In a particular example, preforms of the rim region and the hub and web region of a disk are placed in a forging die and bonded together during forging as a result of material at the interface of the preforms being displaced into vents in the die halves. Potential defects originally present at the interface surfaces are displaced with the material that flows into the vents, forming sacrificial ribs that can be removed from the resulting bonded disk after forging, so that the portion of the bond line remaining in the finish part is of high integrity and substantially free from defects. While effective for bonding hub and rim preforms, the process requires producing the preforms so that their mating surfaces are very clean and closely shape-conforming, carefully assembling the preforms in a can while avoiding contamination, and hot isostatic pressing (HIP) the preforms prior to forging.

BRIEF DESCRIPTION OF THE INVENTION

The present invention provides a process of fabricating rotating hardware, as an example, rotating components of turbomachines, joining techniques used in their fabrication, and rotating hardware formed thereby.

According to a first aspect of the invention, a process for fabricating a rotating component includes fabricating at least two preforms corresponding to at least two portions of the component. Each of the preforms comprises an interface surface at which the preforms can be joined to locate a first of the portions in a radially outward direction from a second of the portions. The preforms are then inertia welded together to form a profile, and such that the interface surfaces of the preforms form a solid-state weld joint located between portions of the profile corresponding to the portions of the component. The solid-state weld joint contains a finer-grained material relative to material in the portions of the profile and define joint surfaces located on opposite axial surfaces of the profile. The profile is then forged with dies to produce a forging containing forging portions corresponding to the portions of the component. The dies define first and second die cavities, of which at least one has a recess into which the finer-grained material from the solid-state weld joint is expelled during forging to purge a joint region of the forging between the forging portions of the finer-grained material. The joint region contains grains distorted in an axial direction of the forging.

Another aspect of the invention is a rotating component having a rotational axis and at least two portions that are welded together. A first of the portions is disposed in a radially outward direction from a second of the portions. A joint region is located between the portions of the component that is free of weld material and free of finer-grained material relative to material in the portions of the component. The joint region also contains grains distorted in an axial direction of the component.

A technical effect of the invention is the ability to produce a rotating component using a welding operation, but with finer-grained materials associated with a weld joint being expulsed from the component. This aspect is advantageous when producing, for example, a multi-alloy rotating component (such as a disk or spool) having rim and hub portions formed of different materials that can be tailored or otherwise particularly selected for the different operating conditions of the rim and hub. In addition, the joint interface between the rim and hub portions of a rotating component is capable of having improved properties without disadvantages associated with the prior art, including cracking and critical grain growth during supersolvus heat treatment. The process of this invention can potentially be applied to a wide variety of alloys, heat treatments, and forging conditions to achieve different grain sizes and structures within the rim and hub regions of the component.

Other aspects and advantages of this invention will be better appreciated from the following detailed description.

DETAILED DESCRIPTION OF THE INVENTION

Figure 1:
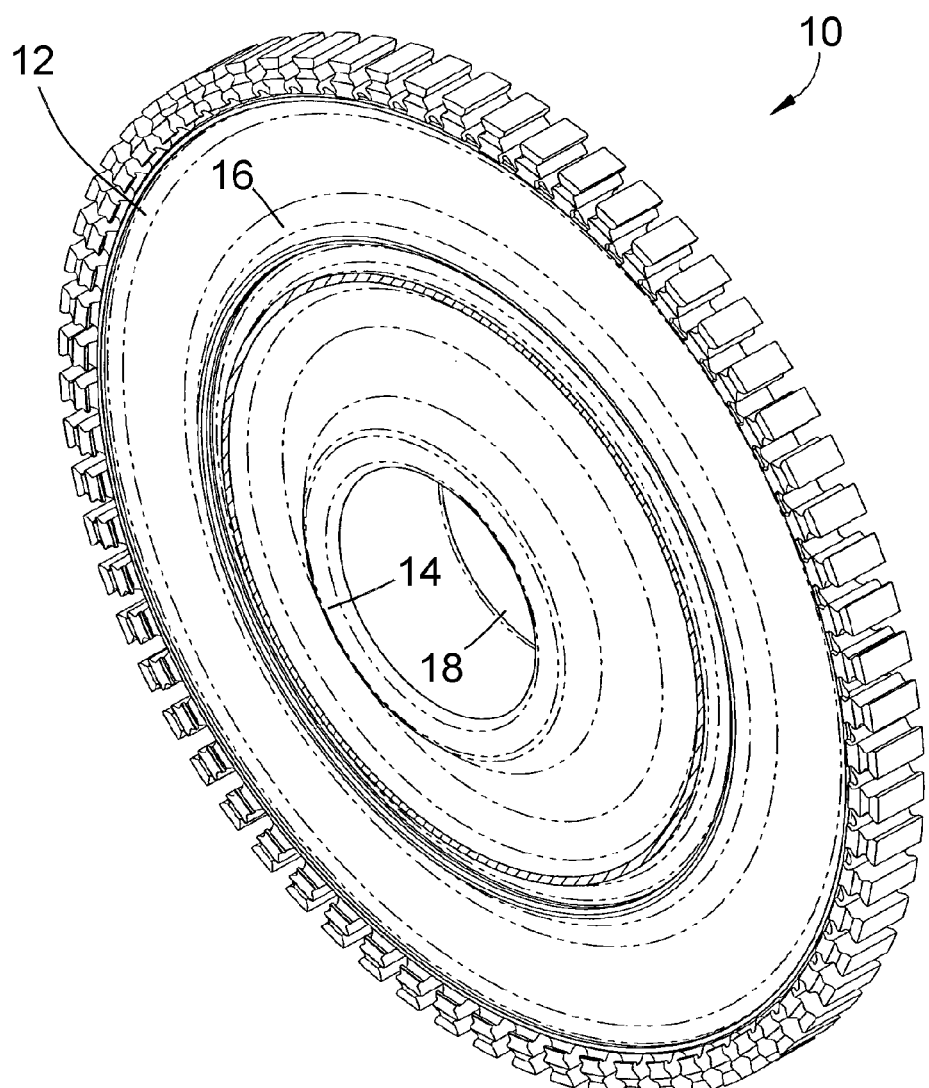
FIG. 1 is a perspective view of a turbine disk of a type used in gas turbine engines.

The present invention will be described with reference to rotating hardware of the type used in turbomachines, and particularly turbine and compressor disks and compressor spools of high-bypass gas turbine engines. For convenience, the invention will be described in particular reference to the turbine disk 10 represented FIG. 1, though it should be understood that the teachings and benefits of the invention are not limited to this particular disk 10 and can be adapted and applied to a wide range of rotating hardware.

Figure 2:
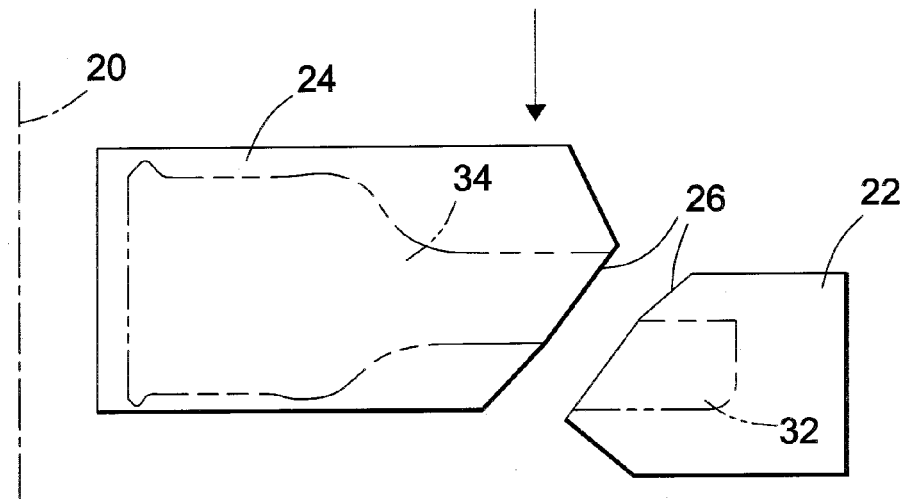
FIGS. 2 through 5 represent steps performed in fabricating a rotating component, such as the disk of FIG. 1, by inertia welding a rim preform to a hub preform and then forging the welded assembly in accordance with an embodiment of the present invention.
Figure 3:
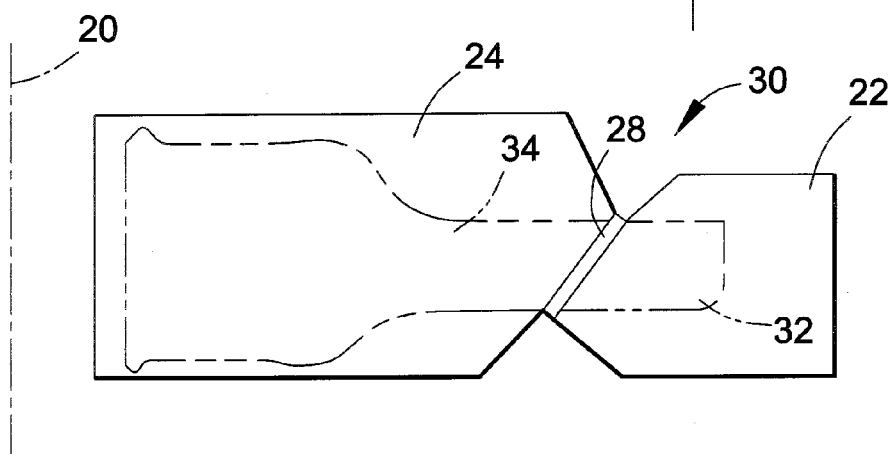
Figure 4:
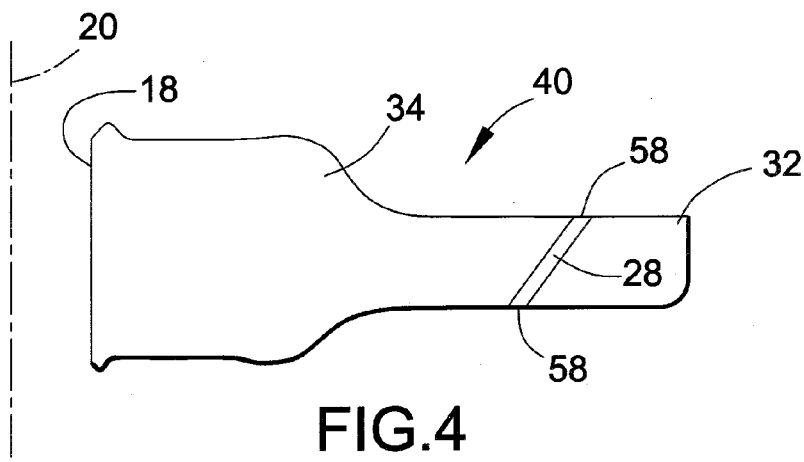
Figure 5:
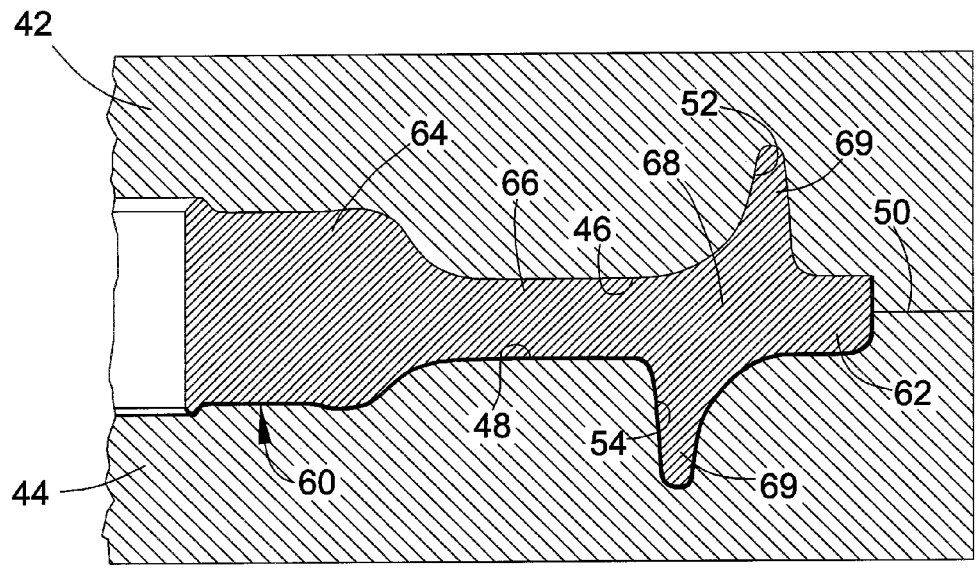
Figure 8:
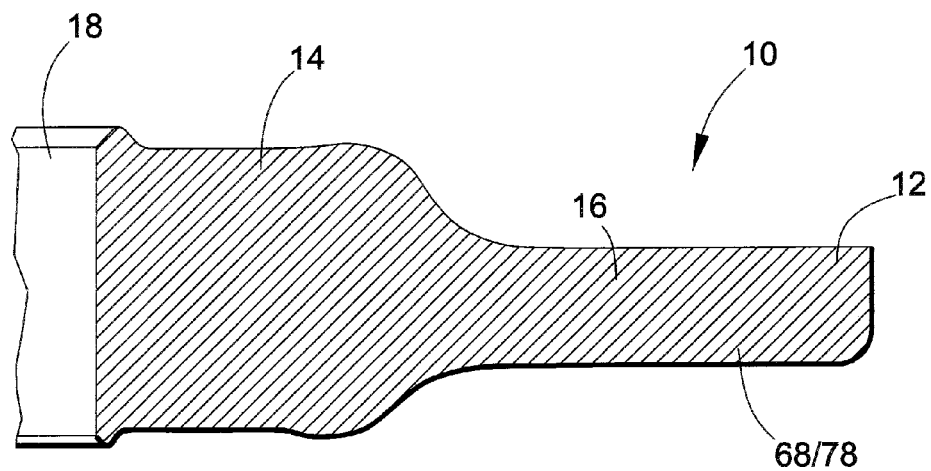
FIG. 8 represents a fragmentary cross-sectional view of a multi-alloy disk that can be produced by a welding-forging process of this invention, and shows the appearance of the disk following removal of an annular flange produced by the forging process of either FIG. 6 or 7.

FIGS. 2 through 5 and 8 represent steps involved in fabricating the disk 10 using an inertia welding technique. A first step represented in FIG. 2 is to prepare rim and hub preforms 22 and 24, which are then inertia welded together in FIG. 3 and then machined in FIG. 4 to yield a disk profile 40 in preparation for forging. The disk profile 40 is then placed in dies 42 and 44 of a forge press that substantially fit the profile 40 everywhere except at the weld joint 28 shown in FIG. 3. FIG. 5 represents the result of the forging operation, during which material flows from the weld joint 28 into cavities or vents 52 and 54 of the dies 42 and 44. Finally, FIG. 8 depicts the result of removing annular flanges 69 from each axial face of the forging 60 produced in FIG. 5, after which finish processing of the disk (for example, heat treatment, sonic inspection, machining to final shape, etc.) can be performed. These steps are discussed in greater detail below.

In FIG. 2, portions of the rim preform 22 and hub preform 24 are represented in cross-section. It should be appreciated that, because of the axisymmetric configuration of the disk 10, there is a diametrically opposite portion of the disk 10 that is not shown in FIG. 2. The preforms 22 and 24 can be produced by a variety of known processes, including billets produced by powder metallurgy (P/M), conventional cast and wrought processing, and spraycast or nucleated casting forming techniques. The preforms 22 and 24 preferably are fine-grained to promote their forgeability. The outlines of rim and hub profiles 32 and 34 are shown in FIGS. 2 and 3, and illustrate that the hub and rim preforms 22 and 24 could be forged or otherwise fabricated prior to inertia welding to produce a disk profile 40 (FIG. 4) that more closely corresponds to the desired geometries of the rim 12, hub 14 and web 16 in the final disk 10.

The preforms 22 and 24 can be produced from a wide variety of materials chosen on the basis of the operating conditions to which the rim 12, hub 14 and web 16 will be subjected when the disk 10 is installed in a turbomachine, such as a gas turbine engine. Nonlimiting examples of suitable materials include the aforementioned gamma prime nickel-base superalloys R88DT and R104, as well as certain nickel-base superalloys commercially available under the trademarks Inconel®, Nimonic®, and Udimet®. Importantly, the rim and hub preforms 22 and 24 can be produced from different alloys, so that the disk 10 is a multi-alloy component whose rim 12, hub 14 and web 16 can be formed of materials better tailored for different operating conditions to which the rim 12, hub 14 and web 16 will be subjected. Also, as will be noted below, the rim and hub preforms 22 and 24 can be produced from different alloys that enable the final article to respond to a mono-temperature heat treatment with different grain growth responses, or to enable the use of a dual heat treatment method to achieve a range of desired structures between the bore 14 and rim 12.

The preforms 22 and 24 are shown in FIG. 2 as having two machined interface surfaces 26, at which joining occurs by inertia welding in FIG. 3. The interface surfaces 26 are represented as being oriented at an angle other than parallel to the axis 20 of the eventual disk 10, providing a contact (draft) angle that facilitates assembling and mating of the annular-shaped rim preform 22 within the hub preform 24, as indicated by the arrows in FIG. 2. Consequently, the resulting weld joint 28 shown in FIG. 3 is also inclined at the same angle. However, it is foreseeable that the interface surfaces 26 of the rim and hub preforms 22 and 24 could be parallel to the disk axis 20. To further facilitate assembly and contact between the preforms 22 and 24, the surfaces 26 are preferably conformably shaped so that they readily slide into contact with each other.

The inertia welding process represented by the steps of FIGS. 2 and 3 is a solid-state welding technique accomplished by rotating the rim preform 22 and/or hub preform 24 about the disk axis 20. As a matter of convenience, the rim preform 22 may be held stationary and the hub preform 24 rotated. While relative rotation is occurring, the rim and hub preforms 22 and 24 are moved together parallel to the axis 20 until the interface surfaces 26 of the preforms 22 and 24 come in contact. As relative rotation continues, the contacting surfaces 26 generate frictional heating, and increasing the application of force in the axial direction increases the temperatures of the regions underlying the surfaces 26 of the rim and hub preforms 22 and 24 to a temperature approaching the incipient melting temperatures of the materials from which the preforms 22 and 24 are made. The axial force, relative rotational speeds and input rotational energy at initiation of welding, and required relative displacements necessary to inertia weld the preforms 22 and 24 will vary, depending on the size, mass and materials of the preforms 22 and 24 and the surface area of their interface surfaces 26. The preforms 22 and 24 are held in contact under these conditions for a period of time sufficient to cause them to bond together along their contacting surfaces 26 as the rotational speed decays to zero, forming a solid-state weld joint 28 that contains fine-grained material as a result of the temperatures sustained during inertia welding.

The disk preform 30 produced by the welded preforms 22 and 24 can be forged or machined after welding to acquire a disk profile 40 represented in FIG. 4, whose geometry is preferably suitable for a forging operation represented in FIG. 5. Alternatively, and as noted above, the preforms 22 and 24 could have been forged or machined prior to welding as indicated by the outlines of the rim and hub profiles 32 and 34 in FIGS. 2 and 3, such that the welding operation approximately yields the disk profile 40 of FIG. 4. FIG. 5 represents a forging 60 produced by subjecting the disk profile 40 of FIG. 4 to a forging operation within two die halves 42 and 44. Die cavities 46 and 48 are defined in the mating surfaces 50 of the die halves 42 and 44 that closely correspond to the final geometry desired for the disk 10, yielding the forging 60 with rim, hub and web portions 62, 64 and 66 corresponding to the rim 12, hub 14 and web 16 of the final disk 10. However, the die cavities 46 and 48 diverge from the desired profile of the disk forging 60 as a result of the presence of two annular-shaped cavities or vents 52 and 54 defined in their surfaces. The vents 52 and 54 are represented as coaxial but having different diameters, so that the vents 52 and 54 are not axially aligned in the axial direction of the disk axis 20 but instead are radially offset from each other. The offset is selected so that the exposed surfaces 58 (FIG. 4) of the solid-state weld joint 28 at each axial surface of the disk profile 40 will face one of the die cavity vents 52 and 54 when forging is initiated, and during forging the exposed surfaces 58 will be displaced or expelled into the vents 52 and 54.

Figure 6:
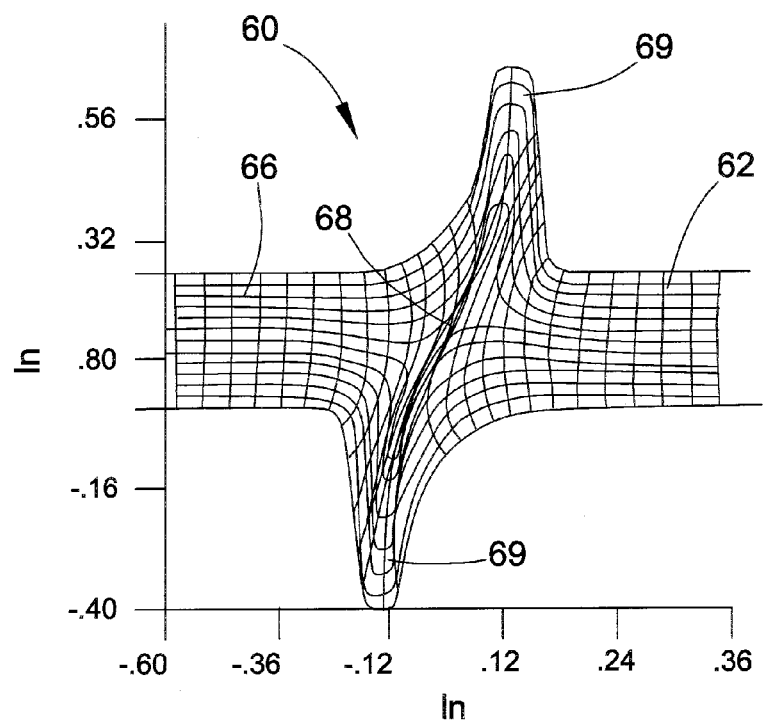
FIG. 6 graphically represents the material flow that occurs in and around the weld joint of a disk during the forging operation of FIG. 5, in which the weld joint material is displaced into offset vents in accordance with an embodiment of the present invention.

The effect of this offset is graphically represented in a model prediction shown in FIG. 6, which indicates a very large degree of metal flow and grain distortion within a joint region 68 of the disk forging 60 where the weld joint 28 of the disk profile 40 was originally present. As evident from FIG. 6, grain distortion within the joint region 68 of the forging 60 is largely in the axial direction of the forging 60, roughly coinciding with the contact angle of the interface surfaces 26 of the preforms 22 and 24 and the angle of the weld joint 28 in the disk profile 40 from which the forging 60 was produced. The effect of this distortion is to purge the forging 60 of the weld joint 28 and the fine-grained material that was present there. As evident from FIG. 5, the vents 52 and 54 are filled with material that was within and immediately adjacent the weld joint 28, resulting in the creation of an annular flange 69 at each of the axial faces of the forging 60. The forging operation is ideally performed so that the flanges 69 contain the fine-grained material originally present within the weld joint 28. This result may be achieved with a single or multiple strokes during the forging operation. Furthermore, it is foreseeable that the disk profile 40 could undergo forging in two steps, such that one of the flanges 69 is first formed with a first set of dies in which a single vent 52 or 54 is present, and then the other flange 69 is formed with a second set of dies in which the other vent 52 or 54 is present. The flanges 69 are then removed during final machining of the forging 60 to produce the desired profile of the disk 10, as shown in FIG. 8.

Figure 7:
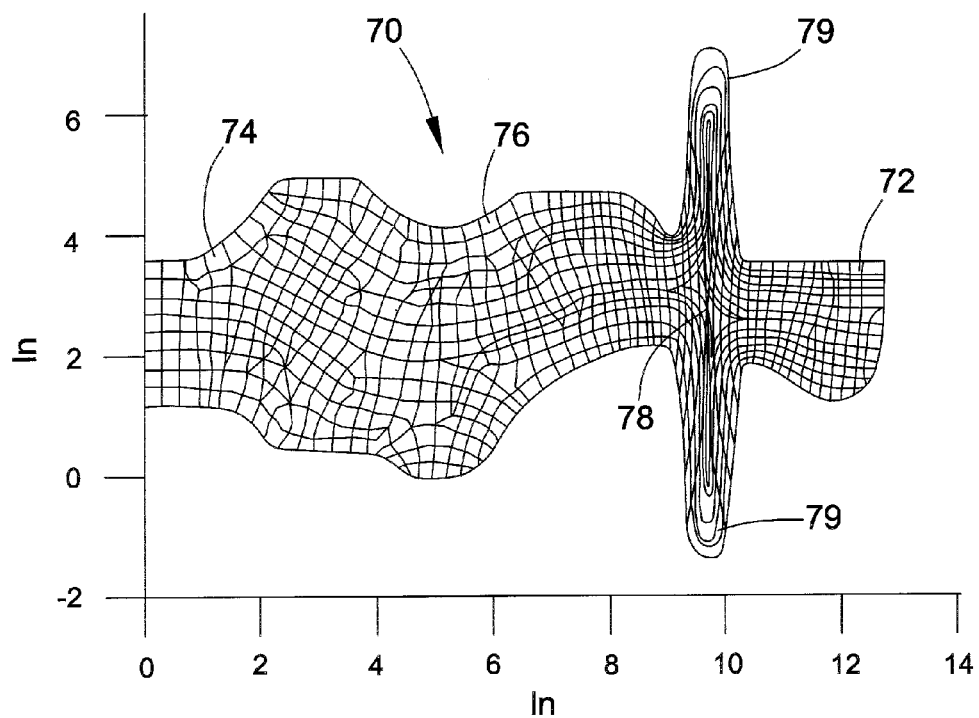
FIG. 7 graphically represents the material flow that occurs in and around a weld joint of a disk produced by an alternative forging operation, in which the weld joint material is displaced into opposed vents during forging in accordance with an embodiment of the present invention.

FIG. 7 is a graph plot similar to FIG. 6, but showing a model prediction of a forging 70 produced from preforms (not shown) whose preform surfaces and resulting weld joint were parallel to the disk axis 20, and then forged with a die (not shown) in which the vents were axially aligned with each other instead of being radially offset as shown in FIG. 5. As evident from FIG. 7, the model predicts that the flanges 79 formed within the vents contain material that was previously within and immediately adjacent the weld joint, though a significant amount of the weld joint material is still within the joint region 78 between the rim and hub forgings 72 and 74. According to this prediction, the offset vents 52 and 54 of FIG. 5 are expected to be more effective in purging a forging of the fine-grained material originally present within the weld joint 28. In view of the above, the contact angle of the preform surfaces 26 (FIG. 2) and the offset of the vents 52 and 54 are considered together to optimize the forging process. A particularly suitable range for the contact angle is believed to be about zero to about forty-five degrees to the disk axis 20, and a preferred range is believed to be about seven to about thirty degrees. However, it is expected that an optimal contact angle will be determined by various factors, including the material(s) of the preforms 22 and 24 and the sizes of the rim and hub preforms 22 and 24 (or the rim and hub profiles 32 and 34). As such, contact angles of as much as sixty degrees and even up to about ninety degrees could possibly be used with the invention.

Suitable forging and heat treatments conditions will depend on the particular materials and sizes of the preforms 22 and 24 or profiles 32 and 34 and are generally within the knowledge and capability of those skilled in the art, particularly in view of the following discussion as well as the teachings of U.S. patent publications cited below, and therefore will not be discussed in any detail here. In most cases, the desire will be to obtain a smoothly varying grain size across the joint region 68/78, while avoiding the fine-grained inertia weld zone associated with conventional inertia welding.

The forging operation performed on the disk profile 40 can be carried out using controlled strain and strain rates to achieve a desired final grain size throughout the forging 60/70, including the joint region 68/78 between the rim and hub portions 62/72 and 64/74 corresponding to the original location of the weld joint 28 within the disk profile 40. The forging parameters are preferably controlled so that the material flow into the vents 52 and 56 within the die cavity is accomplished at controlled strain rates, generally within the regime of superplastic deformation (but for certain alloys possibly outside the region of superplasticity), so that subsequent supersolvus heat treatment of the entire joint region 68/78 in and around the joint 28 of the disk forging 60/70 can be performed without critical grain growth. For example, see the teachings of U.S. Pat. Nos. 4,957,567 to Krueger et al., 5,529,643 to Yoon et al., 5,584,947 to Raymond et al., and 5,759,305 to Benz et al., and U.S. Published Patent Application No. 2009/0000706 to Huron et al. Typically the desire will be to supersolvus heat treat the entire forging 60/70 to produce a metallurgically clean, fully supersolvus disk 10 having a substantially uniform grain size, including the joint region 68/78 encompassing the original location of the weld joint 28.

Grain sizes within the rim 12, hub 14, and web 16 can be further controlled and, if desired, modified by the manner in which the disk profile 40 was produced. For example, the rim and hub profiles 32 and 34 can be separately forged prior to welding, and the rim profile 32 can undergo relatively slower forging at higher temperatures than the hub profile 34 to yield a coarser grain size in the rim profile 32 and, subsequently, a coarser grain size in the rim 12. In addition or alternatively, a dual heat treatment can be performed on the forging 60/70, in which the rim 12 and hub 14 are subjected to different supersolvus and/or different stabilization/aging temperatures to optimize grain size and properties within the rim 12 and hub 14. Examples of dual heat treatment techniques are disclosed in U.S. Pat. Nos. 4,820,358, 5,527,020, 5,527,402 and 6,478, 896.

It should also be noted that the alloys chosen for the rim 12 and bore 14 can be optimized via their major element chemistry composition (for example, to influence gamma-prime solvus composition and content) and their minor element chemistry composition (for example, to influence degree of grain refinement). In addition or alternatively, the rim and hub preforms 22 and 24 can be produced from different alloys that enable or cause the final article to respond to controlled and even mono-temperature heat treatments to achieve different grain growth responses in the rim 12 and bore 14.

While the invention has been described in terms of a specific embodiment, it is apparent that other forms could be adopted by one skilled in the art. Therefore, the scope of the invention is to be limited only by the following claims.

The invention claimed is:

1. A process of fabricating a rotating component having a rotational axis, the process comprising:
   fabricating at least two preforms corresponding to at least two portions of the component, each of the preforms comprising an interface surface at which the preforms can be joined to locate a first of the portions in a radially outward direction from a second of the portions;
   inertia welding the preforms together to form a profile and so that the interface surfaces thereof form a solid-state weld joint located between portions of the profile corresponding to the portions of the component, the solid-state weld joint containing a finer-grained material relative to material in the portions of the profile and defining joint surfaces located on opposite axial surfaces of the profile; and then
   forging the profile with dies to produce a forging containing forging portions corresponding to the portions of the component, the dies defining first and second die cavities, at least one of the die cavities having a recess into which the finer-grained material from the solid-state weld joint is expelled during forging to purge a joint region of the forging between the forging portions of the finer-grained material, the joint region containing grains distorted in an axial direction of the forging.

2. The process according to claim 1, wherein the interface surfaces of the preforms are formed so that the solid-state weld joint of the profile is not parallel to the rotational axis of the component and the joint surfaces are offset from each other in a radial direction of the profile.

3. The process according to claim 2, wherein the interface surfaces of the preforms are inclined relative to the rotational axis of the component at an angle of about 0 to about 60 degrees.

4. The process according to claim 1, wherein the preforms do not undergo forging prior to the inertia welding step.

5. The process according to claim 1, further comprising a forging step so that the preforms are forgings prior to the inertia welding step.

6. The process according to claim 1, wherein the material expelled from the solid-state weld joint into the recess forms an annular-shaped flange on an axial surface of the forging.

7. The process according to claim 6, further comprising removing the annular-shaped flange from the axial surface of the forging.

8. The process according to claim 1, wherein each of the die cavities has a recess into which the material from the solid-state weld joint is expelled during the forging step to purge the forging of the finer-grained material within the weld joint.

9. The process according to claim 1, wherein the preforms are formed of different alloys.

10. The process according to claim 1, wherein the rotating component is a component of a gas turbine engine, and the portions comprise a rim and a hub of the component.

11. The process according to claim 10, wherein the component is a turbine or compressor disk.

12. The process according to claim 11, wherein the joint region is within a web of the disk interconnecting the rim and the hub.

13. The process according to claim 10, further comprising installing the component in a gas turbine engine so that the first portion of the component is located in a radially outward direction from the second portion.

14. A rotating component having a rotational axis, the component comprising:
   at least two portions that are welded together, a first of the portions being disposed in a radially outward direction from a second of the portions;
   a joint region located between the portions of the component that is free of weld material and free of finer-grained material relative to material in the portions of the component, the joint region containing grains distorted in an axial direction of the component.

15. The rotating component according to claim 14, wherein the axial direction in which the grains within the joint region are distorted is not parallel to the rotational axis of the component.

16. The rotating component according to claim 15, wherein the axial direction in which the grains within the joint region are distorted is inclined relative to the rotational axis of the component at an angle of about 0 to about 60 degrees.

17. The rotating component according to claim 14, wherein the portions of the component are formed of different alloys.

18. The rotating component according to claim 14, wherein the rotating component is a component of a gas turbine engine, and the portions comprise a rim and a hub of the component.

19. The rotating component according to claim 18, wherein the component is a turbine or compressor disk.

20. The rotating component according to claim 18, wherein the component is installed in a gas turbine engine so that the first portion of the component is located in a radially outward direction from the second portion.

* * * * *